(12) United States Patent
Nakamura et al.

(10) Patent No.: US 9,218,010 B2
(45) Date of Patent: Dec. 22, 2015

(54) LOAD DRIVING APPARATUS AND CONTROLLING METHOD THEREFOR

(71) Applicant: MINEBEA CO., LTD., Miyota-machi (JP)

(72) Inventors: Yoshihiro Nakamura, Fukuroi (JP);
Shigemi Masuda, Fukuroi (JP);
Toshikazu Koshiba, Fukuroi (JP);
Naoki Yamaguchi, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 233 days.

(21) Appl. No.: 13/958,267

(22) Filed: Aug. 2, 2013

(65) Prior Publication Data
US 2014/0062438 A1   Mar. 6, 2014

(30) Foreign Application Priority Data

Aug. 28, 2012 (JP) ................................. 2012-187316

(51) Int. Cl.
G05F 1/46 (2006.01)
(52) U.S. Cl.
CPC ........................................ *G05F 1/46* (2013.01)
(58) Field of Classification Search
CPC ................................ G05F 1/46; H02M 3/157
USPC .................... 323/351; 398/183; 315/307, 201
See application file for complete search history.

(56) References Cited

U.S. PATENT DOCUMENTS

| 2001/0043093 | A1 | 11/2001 | Sakura et al. |
| 2014/0015443 | A1* | 1/2014 | Nakajo et al. ................. 315/297 |
| 2015/0022084 | A1* | 1/2015 | Suzuki ............................ 315/82 |
| 2015/0028774 | A1* | 1/2015 | Konishi et al. ................ 315/302 |

FOREIGN PATENT DOCUMENTS

JP     A-2001-326569     11/2001

* cited by examiner

*Primary Examiner* — Gary L Laxton
*Assistant Examiner* — Kyle J Moody
(74) *Attorney, Agent, or Firm* — Oliff PLC (57) ABSTRACT

There is provided a load driving apparatus including: a power converter circuit configured to convert electric power into direct current power; an output electric current detecting circuit configured to detect an output current flowing in the load; and a control circuit section configured to switch ON/OFF-operations of the load depending on an operation instruction information, to perform constant current control during a period of the ON-operation of the load, to output a first pulse signal to the power converter circuit when starting the constant current control, ON-duty of the first pulse signal being substantially same as that during a period of a most recent operation of the load performed immediately before, to perform constant voltage control during a period of the OFF-operation of the load based on an output voltage applied to the load, and to output a second pulse signal to the power converter circuit.

13 Claims, 7 Drawing Sheets

Fig. 1
CONFIGURATION OF LOAD DRIVING APPARATUS IN FIRST EMBODIMENT

RISING VOLTAGE WAVEFORM AND RISING CURRENT WAVEFORM AT TIME OF STARTING CONSTANT CURRENT CONTROL IN FIRST EMBODIMENT

LOAD DRIVING APPARATUS AND CONTROLLING METHOD THEREFOR

CROSS REFERENCE TO RELATED APPLICATION

The present application claims priority from Japanese Patent Applications No. 2012-187316 filed on Aug. 28, 2012 the disclosure of which is incorporated herein by reference in its entirety.

BACKGROUND OF THE INVENTION

1. Field of the Invention

The present invention relates to a load driving apparatus which is configured to drive a load to be switched on and off, and to a method for controlling the load driving apparatus.

2. Description of the Related Art

In the recent years, a load driving apparatus which is configured to drive a load such as a Light Emitting Diode (LED), a laser diode, etc. is required to drive the load at a high speed, as information grows in capacity and is processed at a high speed. In particular, in the field of optical communication, a digital optical communication is widely used wherein a light emitting element such as the LED and laser diode as the load is pulse-driven. As the amount of communication processed by the optical communication is increased, there is a demand for a load driving apparatus capable of ON/OFF driving of the light emission at a high speed.

Conventionally, there is disclosed a technique for applying a predetermined bias voltage to a light emitting element, to such an extent that does not cause the light emitting element to emit light, also during an OFF period during which the light emitting element is switched off, as the method for switching the light emitting element ON at a high speed, namely as the method for switching the light emitting element form the OFF state to the ON state in a short period of time.

Japanese Patent Application Laid-open No. 2001-326569 which corresponds to U.S. Patent Application Publication No. US2001/0043093A describes that the problem to be solved thereby is "to minimize the increase in electric current consumption, to reduce a transient responding time, to accelerate modulation and to obtain output light of small pulse waveform distortion even in the LED of a large internal capacity"; and as the solution to the problem, Japanese Patent Application Laid-open No. 2001-326569 describes that "an LED is an element in which the current begins to flow rapidly when a voltage pulse Vd applied to an intrinsic diode of an electric equivalent model reaches a value very close to a peak value, and which is capable of providing optical output proportional to the electric current flowing forward. By utilizing this property of LED, a rectangular voltage pulse having large current driving ability by low output impedance is supplied to a directly connected LED load. Alternatively, a voltage pulse having two high levels such with a high level boosting voltage just after starting and with a voltage returning from the high boosted voltage to a prescribed voltage a predetermined period of time later is supplied to a directly connected LED load. The low level of this voltage pulse is DC-biased in the range of voltage capable of maintaining the extinction ratio of an LED output signal required for the request of a system".

SUMMARY OF THE INVENTION

The invention described in Japanese Patent Application Laid-open No. 2001-326569 realizes a high-speed driving by applying the DC bias voltage to the load of the LED. However, in a case that the load is switched from the OFF state to the ON state in the invention described in Japanese Patent Application Laid-open No. 2001-326569, the following control is performed. Namely, in order to apply the DC bias voltage always to the load even when the load is in the OFF state, a Pulse Width Modulation signal (PWM signal), as a pulse signal having a predetermined ON-duty, is applied to the load. Further, when the load is switched to the ON state, the ON-duty of the PWM signal is gradually expanded. In this case, as will be described later on, the invention described in Japanese Patent Application Laid-open No. 2001-326569 has such a problem that the rise time for the voltage signal applied to the load is long and that the time required for switching the load from the OFF state to the ON state is long.

In view of the above problem, an object of the present teaching is to provide a load driving apparatus capable of performing switching of a load between driving ON and driving OFF at a high speed, and to provide a method for controlling the load driving apparatus.

According to a first aspect of the present teaching, there is provided a load driving apparatus configured to drive a load by electric power supplied from a power source, including:
a power converter circuit configured to convert the electric power supplied from the power source into direct current power and to supply the converted direct current power to the load;
an output electric current detecting circuit configured to detect an output current flowing in the load; and
a control circuit section configured:
to switch an ON-operation and an OFF-operation of the load depending on an operation instruction information inputted from outside of the load driving apparatus,
to perform constant current control during a period of the ON-operation of the load based on the output electric current,
to output a first pulse signal to the power converter circuit when starting the constant current control, ON-duty of the first pulse signal being substantially same as that during a period of a most recent operation of the load performed immediately before, and
to perform constant voltage control during a period of the OFF-operation of the load based on an output voltage applied to the load, and to output a second pulse signal, for applying a predetermined bias voltage to the load, to the power converter circuit.

According to a second aspect of the present teaching, there is provided a controlling method for controlling a load driving apparatus configured to drive a load when receiving a supply of electric power, the method comprising:
performing constant current control during a period of an operation of the load based on an output current, and outputting a first pulse signal when starting the constant current control, ON-duty of the first pulse signal being substantially same as that during a period of a most recent operation of the load performed immediately before; and performing constant voltage control based on an output voltage during a period of an OFF-operation of the load, and outputting a second pulse signal for applying a bias voltage having a predetermined value to the load.

According to the present teaching, it is possible to provide a load driving apparatus capable of performing switching between driving ON and driving OFF of the load at a high speed, and to provide a controlling method for controlling the load driving apparatus.

DESCRIPTION OF THE PREFERRED EMBODIMENTS

An aspect for carrying out the present teaching will be explained as follows, with reference to the drawings.

First Embodiment

Figure 1:
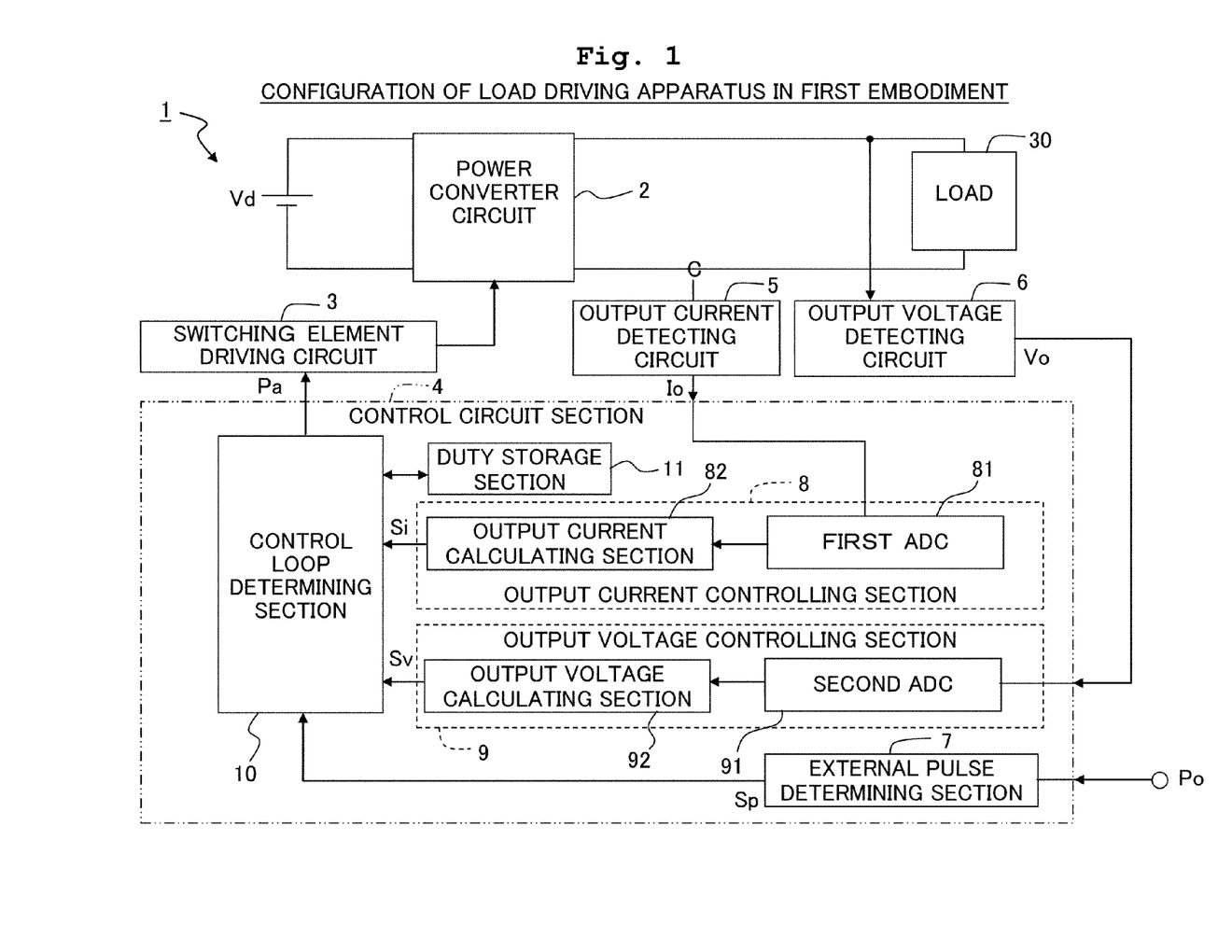
FIG. 1 is a view schematically showing the overall configuration of a load driving apparatus in a first embodiment of the present teaching.

FIG. 1 is a view schematically showing the overall configuration of a load driving apparatus in the first embodiment of the present teaching.

As shown in FIG. 1, a load driving apparatus 1 includes a power converter circuit 2 configured to supply direct current power (hereinafter referred to as "DC power") to a load 30; a switching element driving circuit 3 configured to output a driving signal to a switching element (not shown in the drawing) which is provided on the power converter circuit 2; a control circuit section (micro computer) 4 configured to output a pulse signal Pa to the switching element driving circuit 3 to control an operation of the switching element driving circuit 3; an output electric current detecting circuit 5 configured to detect output current Io flowing in the load 30; and an output voltage detecting circuit 6 configured to detect an output voltage Vo applied to the load 30.

The load driving apparatus 1 is connected to a direct current power source Vd (an example of power source; hereinafter referred to as "DC power source Vd"), the load 30 driven by the direct current, and a host apparatus (not shown in the drawing). The load driving apparatus 1 is configured to convert the power inputted from the DC power source Vd to the DC power, by an external pulse signal Po (an example of operation instruction information) inputted from the non-illustrated host apparatus or a higher-level device, and to perform switching between whether or not the DC power is to be supplied to the load 30. Note that although the host apparatus is exemplified, for example, by pulse generator, this is merely an example, and the present teaching is not limited to such a configuration. Any apparatus may be used, provided that the apparatus has such a configuration that a digital pulse signal for controlling the operation of the load driving apparatus can be outputted.

The power converter circuit 2 is, for example, a voltage transducer circuit for increasing or decreasing the voltage, and is provided with a switching element (not shown in the drawing). The positive and negative terminals of an input terminal of the power converter circuit 2 are connected to the positive and negative terminals of an output terminal of the DC power source Vd; further, the positive and negative terminals of an output terminal of the power converter circuit 2 are connected to the positive and negative terminals of the load 30; and a control input terminal of the power converter circuit 2 is connected to the switching element driving circuit 3. The power converter circuit 2 converts the electric power supplied from the DC power source Vd into a predetermined DC power based on a control signal inputted from the switching element driving circuit 3, and to supply the converted DC power to the load 30.

The switching element driving circuit 3 is, for example, a voltage level converting circuit. An input terminal of the switching element driving circuit 3 is connected to the control circuit section 4 and an output terminal of the switching element driving circuit 3 is connected to the power converter circuit 2. When applying the driving signal to the gate of a switching element such as a Field Effect Transistor (FET) provided on the power converter circuit 2, the switching element driving circuit 3 converts the voltage level of a driving signal outputted by the control circuit section 4 to a voltage level capable of driving the switching element such as the FET, and outputs the driving signal having the converted voltage level. The switching element driving circuit 3 and the power converter circuit 2 apply the output voltage Vo, which corresponds to the ON-duty value of the inputted pulse signal Pa, to the load 30.

The load 30 includes a laser diode element configured to emit a light. The load 30 is configured to convert electric power supplied thereto into an optical signal. When the voltage is applied to the laser diode element of the load 30 in a direction of electric conduction of the laser diode element, a predetermined voltage drop is occurred in the laser diode element.

The control circuit section 4 is, for example, a one-chip micro computer. The control circuit section 4 has a first Analog to Digital Converter (ADC) 81 and a second Analog to Digital Converter (ADC) 91. An input terminal of the first ADC 81 is connected to the output electric current detecting circuit 5, an input terminal of the second ADC 91 is connected to the output voltage detecting circuit 6, a digital input terminal of the control circuit section 4 is connected to the non-illustrated host apparatus, and an output terminal of the control circuit section 4 is connected to the switching element driving circuit 3. The control circuit section 4 outputs the pulse signal Pa, which is a PWM signal by the external pulse signal Po inputted from the non-illustrated host apparatus, to the switching element driving circuit 3 and performs switching between whether to drive the load 30 or not to drive the load 30. In a case of driving the load 30, the control circuit section 4 performs feedback control so that the output current Io flowing through the load 30 has a predetermined target value whereas in a case of not driving the load 30, the control circuit section 4 performs feedback control so that the output voltage Vo has a predetermined target value. The control circuit section 4 controls the output current Io flowing through the load 30 by the ON-duty of the pulse signal Pa. The control circuit section 4 is configured to convert the external pulse signal Po into the power to be supplied to the load 30.

The respective parts or components constructing the control circuit section 4 will be described in detail later on.

The output current detecting circuit 5 is, for example, a shunt resistor, a Hall effect sensor, a combination of a resistor and an operational amplifier, etc. The output electric current detecting circuit 5 is connected between the negative terminal of the load 30 and the negative terminal of on the output terminal of the power converter circuit 2, and an output terminal of the output electric current detecting circuit 5 is connected to the input terminal of the first ADC 81 of the control circuit section 4. The output electric current detecting circuit 5 detects the output current Io flowed through the load 30 and outputs a voltage value corresponding to the value of the output electric current Io. In other words, the output electric current detecting circuit 5 converts the output electric current Io flowing through the load 30, into a voltage value.

The output voltage detecting circuit 6 is, for example, a voltage-dividing resistor, etc. The input terminal of the output voltage detecting circuit 6 is connected to a positive terminal of the load 30, and an output terminal of the output voltage detecting circuit 6 is connected to the input terminal of the second ADC 91 of the control circuit section 4. The output voltage detecting circuit 6 is configured to detect the output voltage Vo which is to be applied to the load 30.

Configuration of Control Circuit Section 4

The control circuit section 4 (an example of operation instruction determining section) includes an external pulse determining section 7 which makes determination regarding the external pulse signal Po (an example of the operation instruction information), an output current controlling section 8 which performs the feedback control of the output current Io, an output voltage controlling section 9 which controls the feedback control of the output voltage Vo, a control loop determining section 10 which performs switching between whether to select the control loop by the output current controlling section 8 or to select the control loop by the output voltage controlling section 9, and a duty storage section 11 (an example of storage section) which stores the duty of the pulse signal Pa.

When the external pulse signal Po is inputted to the external pulse determining section 7, the external pulse determining section 7 is configured to output a pulse controlling signal Sp which indicates an instruction information for the ON/OFF operation of the load 30 included in the external pulse signal Po, to the control loop determining section 10. The external pulse signal Po is, for example, a one-bit signal represented by a High level (H-level) and Low level (L-level). However, the external pulse signal 10 is not limited to this, and may be changed as necessary. For example, the external pulse signal 10 may be an instruction information for the ON/OFF operation included in a serial signal.

The output current control section 8 includes the first ADC 81 which converts an analogue signal to a digital signal, and an output current calculating section 82 which performs, for example, a Proportional Integral Differential calculation (PID calculation). An input terminal of the output current controlling section 8 is connected to the input terminal of the first ADC 81. The output terminal of the output current controlling section 8 is connected to the control loop determining section 10. The output current controlling section 8 performs the feedback control so that the output current Io detected in the output current detecting circuit 5 has, for example, a reference current value stored in a non-illustrated storage section of the control circuit section 4, so as to output an output current controlling signal Si to the control loop determining section 10.

The output voltage controlling section 9 includes the second ADC 91 which converts an analogue signal to a digital signal, and an output voltage calculating section 92 which performs, for example, the PID calculation. An input terminal of the output voltage controlling section 9 is connected to the input terminal of the second ADC 91. An output terminal of the output voltage controlling section 9 is connected to the control loop determining section 10. The output voltage controlling section 9 performs the feedback control so that the output voltage Vo detected in the output voltage detecting circuit 6 has, for example, a reference voltage value stored in the non-illustrated storage section of the control circuit section 4, so as to output an output voltage controlling signal Sv to the control loop determining section 10.

The input terminal of the control loop determining section 10 is connected to the external pulse determining section 7, the output current controlling section 8 and the output voltage controlling section 9. The output terminal of the control loop determining section 10 is connected to the switching element driving circuit 3. The control loop determining section 10 is further connected to the duty storage section 11 in a readable/writable manner. The control loop determining section 10 is configured to select any one of the output current controlling signal Si and the output voltage controlling signal Sv based on the pulse controlling signal Sp to thereby output the pulse signal Pa to the switching element driving circuit 3.

The duty storage section 11 is configured to store information, and is connected to the control loop determining section 10. The duty storage section 11 is configured to store the ON-duty value of the PWM signal (first pulse signal Pa1) during a most recent ON-operation period of the load 30 performed immediately before.

Operation of First Embodiment

Figure 2:
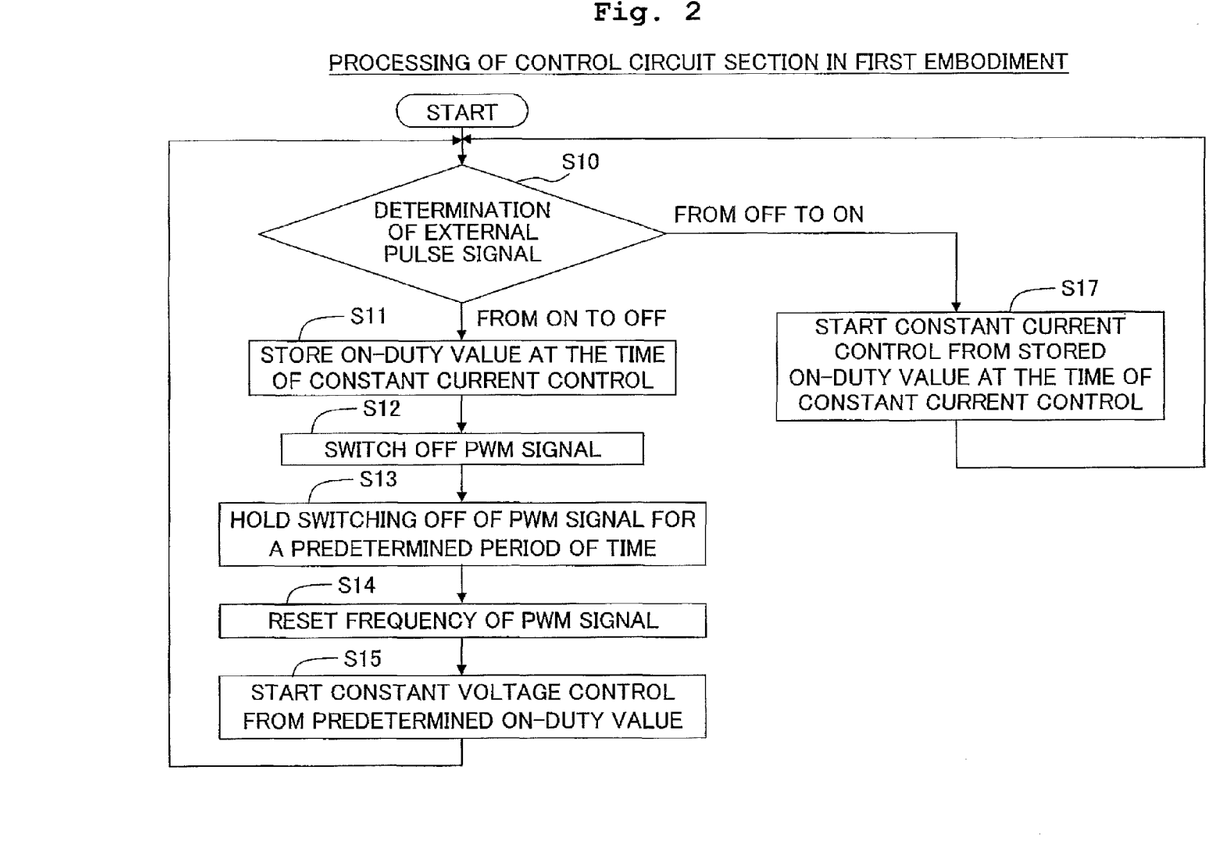
FIG. 2 is a flow chart showing a processing performed in a control circuit section in the first embodiment.
Figure 3A:
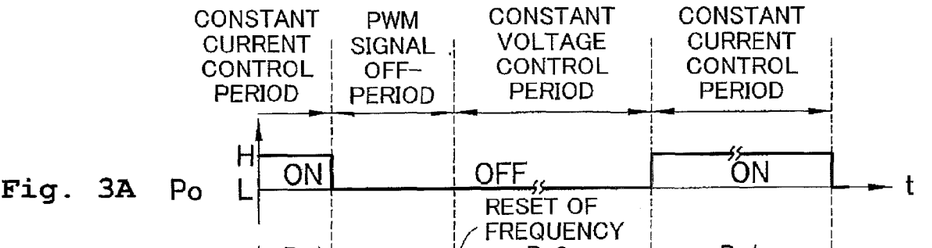
FIGS. 3A to 3D are schematic views showing waveform of main parts or components of the load driving apparatus in the first embodiment.
Figure 3B:
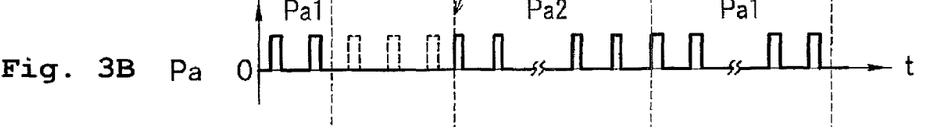
Figure 3C:
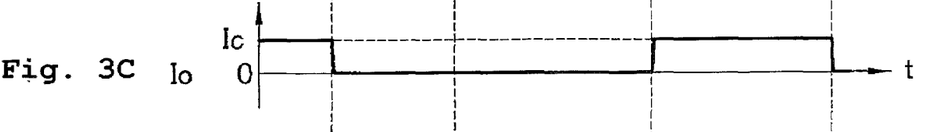
Figure 3D:
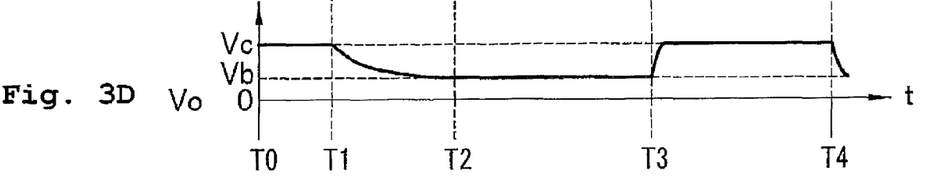

FIG. 2 is a flow chart showing the processing performed by the control circuit section in the first embodiment.

As shown in FIG. 2, after the processing is started, the control loop determining section 10 of the control circuit section 4 (see FIG. 1) makes determination regarding the external pulse signal Po in Step S10 based on the pulse controlling signal Sp inputted from the external pulse determining section 7. When the external pulse signal Po changes from ON to OFF, the control circuit section 4 performs a processing of Step S11; on the other hand, when the external pulse signal Po changes from OFF to ON, the control circuit section 4 performs a processing of Step S17.

In Step S11, the control loop determining section 10 stores the ON-duty value of a pulse signal during a period of constant current control (constant current control period), in the duty storage section 11. In other words, the control loop determining section 10 stores the ON-duty value of a first pulse signal Pa1 during the ON period of the load 30, in the duty storage section 11. For example, the control loop determining section 10 can also store, as the ON-duty value, the average value of the ON-duty values of all the pulses during the ON period.

In Step S12, the control loop determining section 10 stops or turns off the output of the first pulse signal Pa1.

In Step S13, the control loop determining section 10 holds the stopping of output of the PWM signal (first pulse signal Pa1, second pulse signal Pa2) for a predetermined period of time. The term "predetermined period of time" means the OFF-period of the PWM signal.

In Step S14, the control loop determining section 10 resets the frequency of the PWM signal so that a second pulse signal Pa2 is outputted at a timing same as the elapse of the predetermined period of time.

In Step S15, the control loop determining section 10 instructs the output voltage controlling section 9 so that the second pulse signal Pa2 is outputted with a predetermined ON-duty value (fixed value) that has been previously set, so as to start the constant voltage control (feedback control) and to return the procedure to the processing of Step S10. After that, the control loop determining section 10 performs the processing in Step S10 for making determination for the external pulse signal Po based on the pulse controlling signal Sp; in parallel to this, the output voltage controlling section 9 performs the constant voltage control so that a predetermined bias voltage Vb is applied to the load 30, by a pulse signal Pa of which ON-duty value is smaller than that of the first pulse signal Pa1. Here, the bias voltage Vb is adjusted to have a voltage value within such a range that the load 30 is not switched ON. Note that the output voltage controlling section 9 causes the second pulse signal Pa2 to always have a predetermined, same ON-duty value at the time of starting the constant voltage control period; and after the start of constant voltage control period, the output voltage controlling section 9 adjusts the ON-duty value of the pulse signal Pa based on the output voltage controlling signal Sv. However, the present teaching is not necessarily limited only to the configuration wherein the output voltage controlling section 9 performs the control so that the second pulse signal Pa2 always has a value that is strictly same as the same, predetermined ON-duty value at the time of starting the constant voltage control period. For example, the output voltage controlling section 9 may perform control such that the second pulse signal Pa2 has a substantially constant ON-duty value at the time of starting the constant voltage control period.

In Step S17, the control loop determining section 10 outputs the first pulse signal Pa1 having the ON-duty value during the constant current control stored in the duty storage section 11 (for example, the average value of the ON-duty values during the ON period in the most recent ON-operation of the load 30 performed immediately before), to thereby start the constant current control and to return the procedure to the processing of Step S10. After this, the control loop determining section 10 performs the processing for determining the external pulse signal Po based on the pulse controlling signal Sp; in parallel to this, the output current controlling section 8 performs the constant current control to drive the load 30.

The output current controlling section 8 causes the first pulse signal Pa1 to always have a predetermined, same ON-duty value at the time of starting of the constant current control period (i.e. the ON-operation period of the load 30); and then, the output current controlling section 8 adjusts the ON-duty value of the pulse signal Pa based on the output current controlling signal Si. However, the present teaching is not necessarily limited only to the configuration in which the output current controlling section 8 controls the first pulse signal Pa1 to always be strictly same as the stored ON-duty value at the time of starting the constant current control period. For example, the output current controlling section 8 may control the first pulse signal Pa1, at the time of starting the constant current control period, such that the first pulse signal Pa1 has a ON-duty value which is substantially same as the stored ON-duty value.

Explanation of Specific Operation

FIGS. 3A to 3D are schematic views showing the signal waveforms of main parts or components of the load driving apparatus in the first embodiment.

Time "T0" to T1 is an ON-operation period (constant current control period) of the load 30. During this period, the external pulse signal Po is H-level and is an ON-operation instruction for the load 30. The first pulse signal Pa1 is outputted from the control circuit section 4. The output current Io is controlled to be a predetermined constant current Ic. The output voltage Vo is a value in the neighborhood of a predetermined voltage Vc that is a value corresponding to the current-voltage characteristic of the laser diode.

Time T1 to T2 is an OFF-operation period of the load 30 and an OFF-period of the PWM signal. During this period, the external pulse signal Po is L-level and is an OFF-operation instruction for the load 30. The output current Io is 0[A]. The output voltage Vo is gradually lowered as the time passes.

Time T2 to T3 is an OFF-operation period of the load 30 and is the current voltage control period as well. At Time T2, the control circuit section 4 outputs the second pulse signal Pa2 at the predetermined ON-duty value previously set, to thereby start the constant voltage control. The output current Io is about 0[A]; and the output voltage Vo is the predetermined bias voltage Vb. Concurrently with the start of the constant voltage control at Time T2, the control circuit section 4 performs control so that the pulse of the second pulse signal Pa2 is ON, thereby resetting the frequency of the PWM signal. Note that the length of time T1 to T2 that is the OFF period of the PWM signal is set such that the output voltage controlling section 9 starts the constant voltage control at a timing at which the output voltage Vo becomes close to the bias voltage Vb.

Time T3 to T4 is the ON-operation period of the load 30 and is the constant current control period as well. At Time T3, the control circuit section 4 starts to output the first pulse signal Pa1 at the predetermined ON-duty value stored in the duty storage section 11 (the average value of the ON-duty values during the most recent ON-operation period of the load 30 performed immediately before), to thereby start the constant current control. The output current Io is subjected to the constant current control so that the output current Io is the constant current Ic. The output voltage Vo is the value in the neighborhood of the voltage Vc that is the value corresponding to the current-voltage characteristics of the laser diode.

Next, an explanation will be made about the effect obtained by outputting a PWM signal having the stored ON-duty value at the time of starting the constant current control, as follows.

Figure 4A:
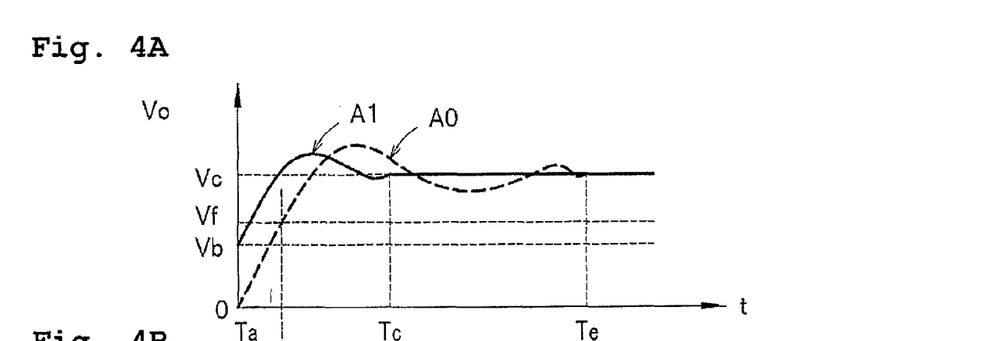
Figs. 4A to 4C are schematic views each showing the rising voltage waveform and current waveform at the time of starting constant current control in the first embodiment.
Figure 4B:
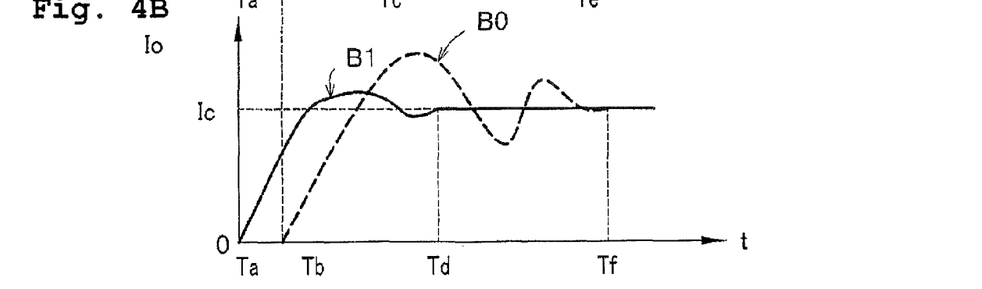
Figure 4C:
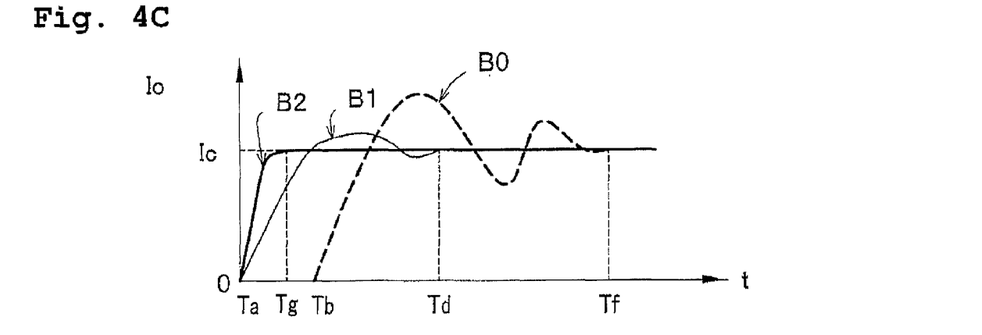

FIGS. 4A to 4C are schematic views each showing the rising voltage waveform and current waveform at the time of starting constant current control in the first embodiment.

FIG. 4A is a schematic view showing the comparison between waveform of the output voltage Vo with the bias voltage Vb and waveform of the output voltage Vo without the bias voltage Vb. The vertical axis of FIG. 4A shows the output voltage Vo, and the horizontal axis of FIG. 4A shows Time "t" that is common with FIG. 4B as well. A broken line A0 in the drawing shows a waveform of the output voltage Vo in a case that the bias voltage Vb is not applied; a solid line A1 in the drawing shows a waveform of the output voltage Vo in a case that the bias voltage Vb is applied.

FIG. 4B is a schematic view showing the comparison between waveform of the output current Io with the bias voltage Vb and waveform of the output current Io without the bias voltage Vb. The vertical axis of FIG. 4B shows the output current Io, and the horizontal axis of FIG. 4B shows Time "t" that is common with FIG. 4A as well. A broken line B0 in the drawing shows a waveform of the output current Io in a case that the bias voltage Vb is not applied; a solid line B1 in the drawing shows a waveform of the output current Io in a case that the bias voltage Vb is applied.

First, an explanation will be given about a case of not applying the bias voltage Vb during the OFF-operation period of the load 30.

As shown in FIG. 4A, the output voltage Vo (broken line A0) is raised from 0[V] at Time Ta, reaches a forward voltage Vf at Time Tb, repeatedly fluctuates due to the overshoot, and then at Time Te converges at the neighborhood of the voltage Vc that is the value corresponding to the current-voltage characteristic of the laser diode. As shown in FIG. 4B, the output current Io (broken line BO) starts to flow from Time Tb, repeatedly fluctuates due to the overshoot, and then at Time Tf converges at the constant current Ic. The transient response time of the output voltage Vo is Time Ta to Te. The transient response time of the output current Io is Time Ta to Tf.

This can be explained as follows: regarding an element such as LED, a laser diode, etc., a predetermined voltage drop is occurred in the element when applied with voltage in a direction of electric conduction of the element. This voltage drop is referred to as the forward voltage Vf of the element. In a case that the load 30 is such an element and the electric power of step response is applied, the driving of the load 30 corresponding to the supplied electric power theoretically creates a time lag (delay). For example, a case is considered wherein a load 30 is composed of 5 pieces of laser diode elements of which forward voltage Vf is 1.5 [V] and which are connected in serial. In a case of driving such a load 30, the total forward voltage of the five laser diode elements is 7.5 [V]. In order to pass the current in the load 30, a voltage exceeding the forward voltage Vf=7.5 [V] is required. Therefore, even when the output voltage Vo starts to rise, the output current I0 does not rise; and after the output voltage exceeds the forward voltage Vf that is 7.5 [V], the output current 10 starts to rise.

Next, an explanation will be given about a case of applying the bias voltage Vb during the OFF-operation period of the load 30.

As shown in FIG. 4A, the output voltage Vo (sold line A1) starts to rise from the bias voltage Vb at Time Ta, exceeds the forward voltage Vf immediately after the rising, and then at Time Tc converges at the neighborhood of the voltage Vc that is the value corresponding to the current-voltage characteristic of the laser diode.

As shown in FIG. 4B, the output current Io (sold line B1) starts to flow immediately after Time Ta, repeatedly fluctuates due to the overshoot, and then at Time Td converges at the constant current Ic. The transient response time of the output voltage Vo is Time Ta to Tc. The transient response time of the output current Io is Time Ta to Td.

In such a manner, in a case of applying the bias voltage Vb to the load 30 during the OFF-operation period of the load 30, the output current Io starts to flow immediately after the output current Vo has raised. In this case, the overshoots in the output voltage Vo and the output current Io are small, and the transient response times thereof are also short.

In the control circuit section 4, the ON-duty value of the PWM signal controlled by the control circuit section 4 is different between the constant voltage control period during which the bias voltage Vb is applied and the constant current control period during which the load 30 is driven. Therefore, the control circuit section 4 of the comparative embodiment (as shown by the broken lines A0 and B0 in FIGS. 4A and 4B) performs control by the step response when switching from the constant voltage control to the constant current control. Namely, at the time of starting ON-operation period of the load 30, the control circuit section 4 outputs the PWM signal of which ON-duty value is small, and increases the ON-duty gradually. Due to this, the rising of the output current Io is delayed or slow.

FIG. 4C is a schematic view showing the comparison between waveform of the output current Io with the presence of current control start by the first pulse signal Pa1 having the stored ON-duty value and waveform of the output current Io with the absence of the current control start by the first pulse signal Pa1. The vertical axis of FIG. 4C shows the output current Io, and the horizontal axis of FIG. 4C shows Time "t" that is common with FIG. 4A as well. A broken line B0 in the drawing shows a waveform of the output current Io in a case that the bias voltage Vb is not applied; a thin solid line B1 shows a waveform of the output current Io in a cases that the bias voltage Vb is applied; and a solid line B2 in the drawing shows a waveform of the output current Io in a case that the bias voltage Vb is applied and the current control is started with the first pulse signal Pa1 having the stored ON-duty value.

In this embodiment, in a case that the current control is started with the first pulse signal Pa1 having the stored predetermined ON-duty value (for example, ON-duty value of the most recent ON-operation period immediately before), the output current Io having a predetermined value flows at once as indicated by the solid line B2. Accordingly, the rising time of the output current Io is further shortened than that of a comparative embodiment applied with the bias voltage Vb and shown in FIG. 4C shown by the thin solid line B1; and the output current Io of the embodiment converges at the constant current Ic at Time Tg, and becomes stable. In this case, the transient response time of the output current Io is Time Ta to Tg.

Next, an explanation will be given about the effect obtained by providing the period during which the PWM signal is switched OFF.

Figure 5A:
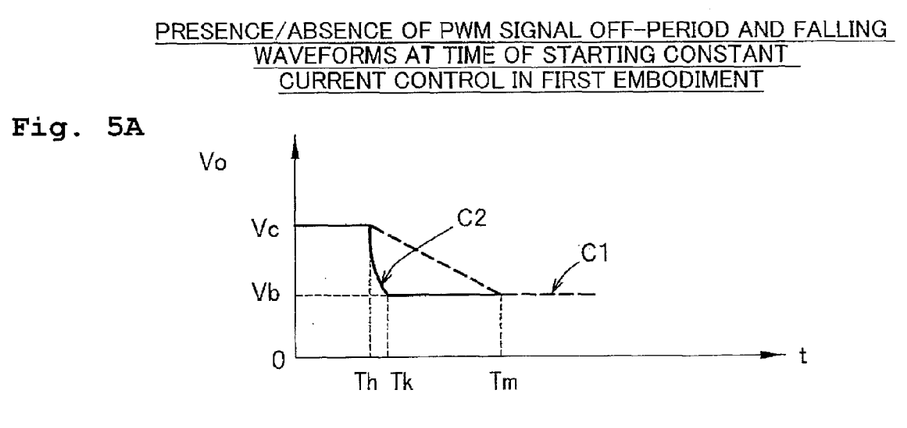
FIGS. 5A and 5B are schematic views each showing the presence/absence of PWM signal off period, during which a PWM signal is switched off, and falling waveforms at the time of staring the constant current control in the first embodiment.
Figure 5B:
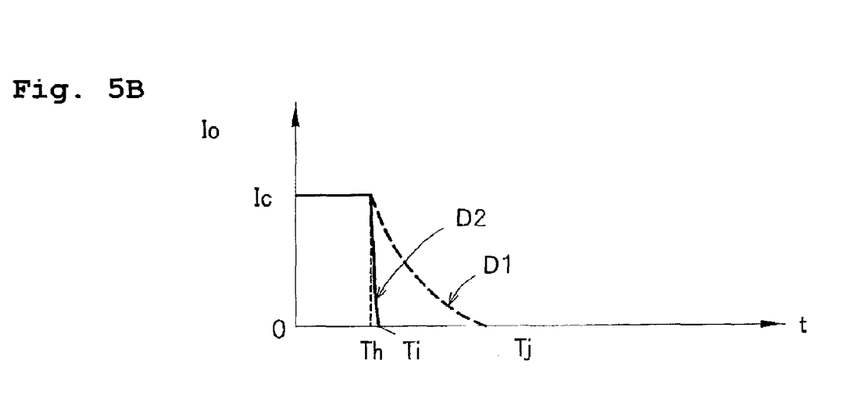

FIGS. 5A and 5B are schematic views each showing the presence or absence of PWM signal OFF period, during which the PWM signal is switched OFF, and a falling waveform at the time of starting the constant current control in the first embodiment.

FIG. 5A is a schematic view showing the comparison between waveform of the output voltage Vo with the presence of the PWM signal OFF period and waveform of the output voltage Vo with the absence of the PWM signal OFF period. The vertical axis of FIG. 5A shows the output voltage Vo, and the horizontal axis of FIG. 5A shows Time "t" that is common with FIG. 5B as well. Broken line C1 in the drawing shows waveform of the output voltage Vo in a case that the PWM signal OFF period is absent, and sold line C2 in the drawing shows waveform of the output voltage Vo in a case that the PWM signal OFF period is present.

FIG. 5B is a schematic view showing the comparison between waveform of the output current Io with the presence of the PWM signal OFF period and waveform of the output current Io with the absence of the PWM signal OFF period. The vertical axis of FIG. 5B shows the waveform of the output current Io, and the horizontal axis of FIG. 5B shows Time "t" that is common with FIG. 5A as well. Broken line D1 in the drawing shows waveform of the output current Io in a case that the PWM signal OFF period is absent, and solid line D2 in the drawing shows waveform of the output current Io in a case that the PWM signal OFF period is present.

First, an explanation will be given about a case that the PWM signal OFF period is absent.

At Time Th, the control circuit section 4 starts the OFF operation of the load 30. At Time Th and thereafter, although the control circuit section 4 performs switching from the constant current control to the constant voltage control, the control is performed such that the ON-duty value is gradually decreased from a state that the ON-duty value is great until the ON-duty value reaches the bias voltage Vb. Therefore, the output voltage Vo is decreased gradually as shown by the broken line C1 in the drawing. At Time Tm, the output voltage Vo reaches the bias voltage Vb. As a result, the output current Io is decreased gradually as shown in the broken line D1 in the drawing, and the output current Io reaches 0[A] at Time Tj.

Next, an explanation will be given about a case that the PWM signal OFF period is present.

At Time Th, the control circuit section 4 starts the OFF operation of the load 30. At Time Th and thereafter, the control circuit section 4 performs switching from the constant current control to the constant voltage control. At this time, the control is performed such that the ON-duty value is quickly decreased from a state that the ON-duty value is great until the ON-duty value reaches the bias voltage Vb. Namely, since the state that the ON-duty value is great is changed to a state that the ON-duty value is 0 (zero), the output voltage is decreased quickly. The period of time during which the OFF-operation of the load 30 is being performed, namely the period of time during which the ON-duty value is 0, is set to be substantially same as a period of time during which the output voltage Vo is decreased from the voltage Vc to the bias voltage Vb, as will be described later on. Accordingly, the output voltage Vo is decreased quickly at the same time when the OFF-operation of the load 30 is started, and the output voltage Vo reaches the bias voltage Vb at Time Tk, as shown by the solid line C2 in FIG. 5A. As a result, the output current Io is decreased quickly, and the output current Io reaches 0[A] at Time Ti, as shown by the solid line D2 in FIG. 5B.

In a case that the PWM signal OFF period is absent, the output current Io flows for a relatively long period of time (Time Th to Tj), as shown by the broken line D1. On the other hand, in a case that the PWM signal OFF period is present, the output current Io becomes 0 in a relatively short period of time (Time Th to Ti).

Accordingly, when the external pulse signal Po is switched from ON to OFF, the driving of the load 30 can be immediately switched OFF. Therefore, the load driving apparatus 1 can drive the load 30 at an accurate timing. Further, in a case that the load 30 is a light emitting element which emits an optical signal, the load driving apparatus 1 can switch OFF the optical signal with a minimum delay with respect to a timing at which the external pulse signal Po is switched from ON to OFF.

Furthermore, the load driving apparatus 1 can switch the load 30 OFF in an ensured manner even in a case that the OFF operation period of the load 30 is short.

Note that when the PWM signal OFF period is too long, the output voltage Vo is lowered than the bias voltage Vb, and the time required for the load driving apparatus 1 to make the output voltage Vo converge at the bias voltage Vb becomes long. On the other hand, when the PWM signal OFF period is too short, the constant voltage control is started before the output voltage Vo reaches the bias voltage Vb, and the time required for the load driving apparatus 1 to make the output voltage Vo converge at the bias voltage Vb becomes long. Therefore, the PWM signal OFF period is set to be a period of time during which the output voltage Vo takes a value approximate to the bias voltage Vb.

Next, an explanation will be given about the effect obtained by resetting the frequency of the second pulse signal Pa2 at the time of starting the constant voltage control.

Figure 6:
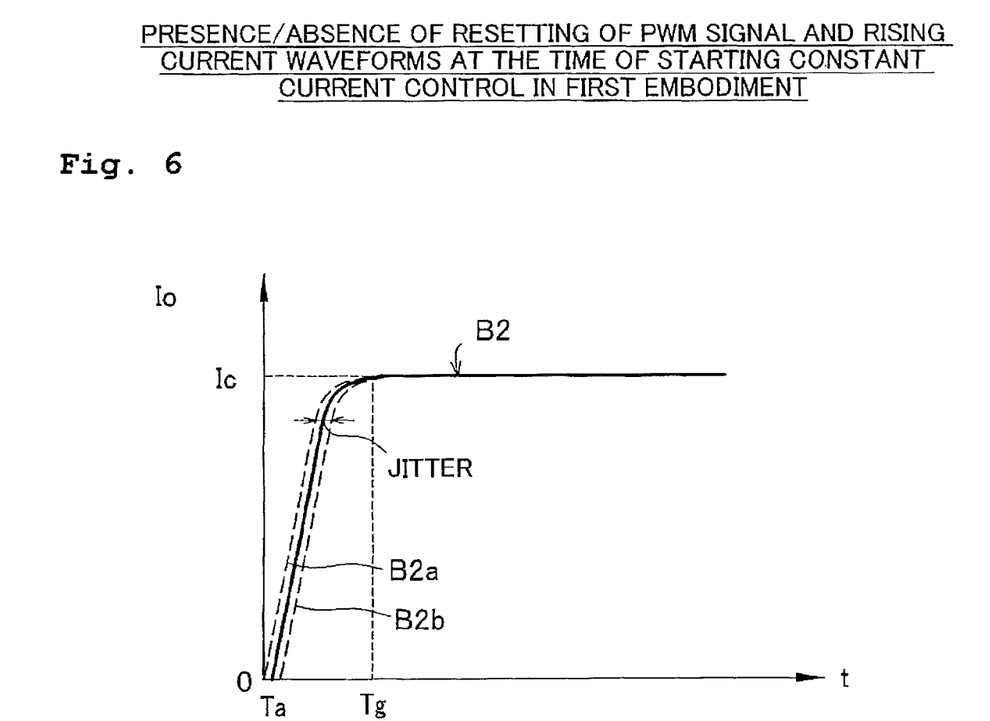
FIG. 6 is a schematic view showing the presence/absence of resetting the PWM signal and rising waveforms at the time of starting the constant current control in the first embodiment.

FIG. 6 is a schematic view showing presence or absence of resetting the PWM signal and a rising waveform at the time of starting constant current control in the first embodiment.

Here, when the constant voltage control is started, the control loop determining section 10 performs comparison between the presence and absence of resetting the frequency of the second pulse signal Pa2, and comparison of the rising waveforms of the output current Io between the presence and the absence of the resetting the frequency of the second pulse signal Pa2.

The external pulse signal Po of the embodiment is provided by converting an electric signal to an optical signal and to perform communication, and thus the ON and OFF of the external pulse signal Po is switched at an external pulse frequency based on the protocol of optical communication. In other words, the external pulse signal Po is inputted as a signal having a frequency which has a predetermined width but which is not necessarily constant. On the other hand, since the PWM signal has a constant frequency, the pulse frequency of the external pulse signal Po is not necessarily an integral multiple of the frequency of the PWM signal. Here, a case is considered wherein the frequency of the external pulse signal is not an integral multiple of the frequency of the PWM signal.

At first, an explanation will be given about a case wherein the frequency of the second pulse signal Pa2 is not reset when starting the constant voltage control.

When the pulse frequency of the second pulse signal Pa2 is not reset, the timing of the first rising pulse of the second pulse signal Pa2 is varied or fluctuated, at the frequency of the PWM signal, with respect to the timing at which the external pulse signal Po is switched from ON to OFF.

For example, when the external pulse signal Po is repeatedly switched between OFF and ON at the external pulse frequency, the timing of the rising pulse of the second pulse signal Pa2 is fluctuated relative to the timing at which the external pulse signal Po is switched from OFF to ON, every time when the constant current control is started at the rising of the output current Io. Due to this, the rising timing of the output current Io is varied as shown by broken lines B2a and B2b in FIG. 6, thereby generating jitter having the frequency of the PWM signal in the output current Io.

Next, an explanation will be given about a case wherein the frequency of the second pulse signal Pa2 is reset when starting the constant voltage control.

By resetting the pulse frequency of the second pulse signal Pa2, the timing of the first rising pulse of the second pulse signal Pa2 is always same with respect to the timing at which the external pulse signal Po is switched from ON to OFF.

For example, when the external pulse signal Po is repeatedly switched between ON and OFF at the external pulse frequency, the timing of the rising pulse of the second pulse signal Pa2 is same with respect to the timing at which the external pulse signal Po is switched from OFF to ON, every time when the constant current control is started at the rising of the output current Io. Due to this, the rising timing of the output current Io is not varied as shown by a solid line B2 in FIG. 6, and no jitter is occurred since the output current Io rises always after a stable, same delay time.

The load 30 starts to be driven always after a stable, same delay time with respect to the timing at which the external pulse signal Po is switched from OFF to ON. With this, it is possible to decrease the jitter in the pulse of the optical communication and to improve the quality of the optical communication.

The first embodiment as described above have the following effects (A) to (D).

(A) The load driving apparatus 1 applies the predetermined bias voltage Vb to the load 30 during the period of time during which the operation instruction of the external pulse signal Po is OFF. Further, when the operation instruction of the external pulse signal Po is switched from OFF o ON, the load driving apparatus 1 outputs the ON-duty value of the most recent ON-operation period performed immediately before to the switching element driving circuit 3 and to the power converter circuit 2. With these processings, the load driving apparatus 1 can switch the load 30 from OFF to ON at a high speed, and can stabilize the rising of the output voltage Vo to be applied to the load 30.

(B) When the operation instruction of the external pulse signal Po is switched from ON to OFF, the load driving apparatus 1 stops the pulse signal Pa for the predetermined period of time. By doing so, the load driving apparatus 1 can quickly reduce the output voltage Vo and the output current Io and to switch the load 30 from ON to OFF at a high speed.

(C) After the operation instruction of the external pulse signal Po is switched from ON to OFF and the load driving apparatus 1 stops the pulse signal Pa for the predetermined period of time, the load driving apparatus 1 further instructs the output voltage controlling section 9 to output the second pulse signal Pa2 with the predetermined ON-duty value (fixed value) that has been previously set, so as to start the constant voltage control (feedback control). By doing so, the load driving apparatus 1 can converge the output voltage Vo to the bias voltage Vb, thereby making it possible to switch the load 30 from OFF to ON at a high speed when the operation instruction of the external pulse signal Po is switched from OFF to ON.

(D) After the load driving apparatus 1 stops the pulse signal Pa and then when the load driving apparatus 1 outputs the second pulse signal Pa2 with the predetermined ON-duty value (fixed value) that has been previously set, the load driving apparatus 1 further resets the pulse frequency of the second pulse signal Pa2. By doing so, when the operation instruction of the external pulse signal Po is switched from OFF to ON, the load driving apparatus 1 can suppress the rising jitter of the output current Io, thereby making it possible to start the driving of the load 30 always at a same timing.

Configuration of Second Embodiment

A load driving apparatus 1 of the second embodiment is configured in a similar manner as the load driving apparatus 1 of the first embodiment (FIG. 1).

When the external pulse signal Po is changed or transited from OFF to ON, the load driving apparatus 1 of the second embodiment is configured to store an ON-duty value during the most recent constant voltage control period performed immediately before; and when the external pulse signal Po is transited from ON to OFF, the load driving apparatus 1 is configured to switch the pulse signal Pa OFF for a predetermined period of time and to start the constant voltage control based on the stored ON-duty value.

Operation of Second Embodiment

Figure 7:
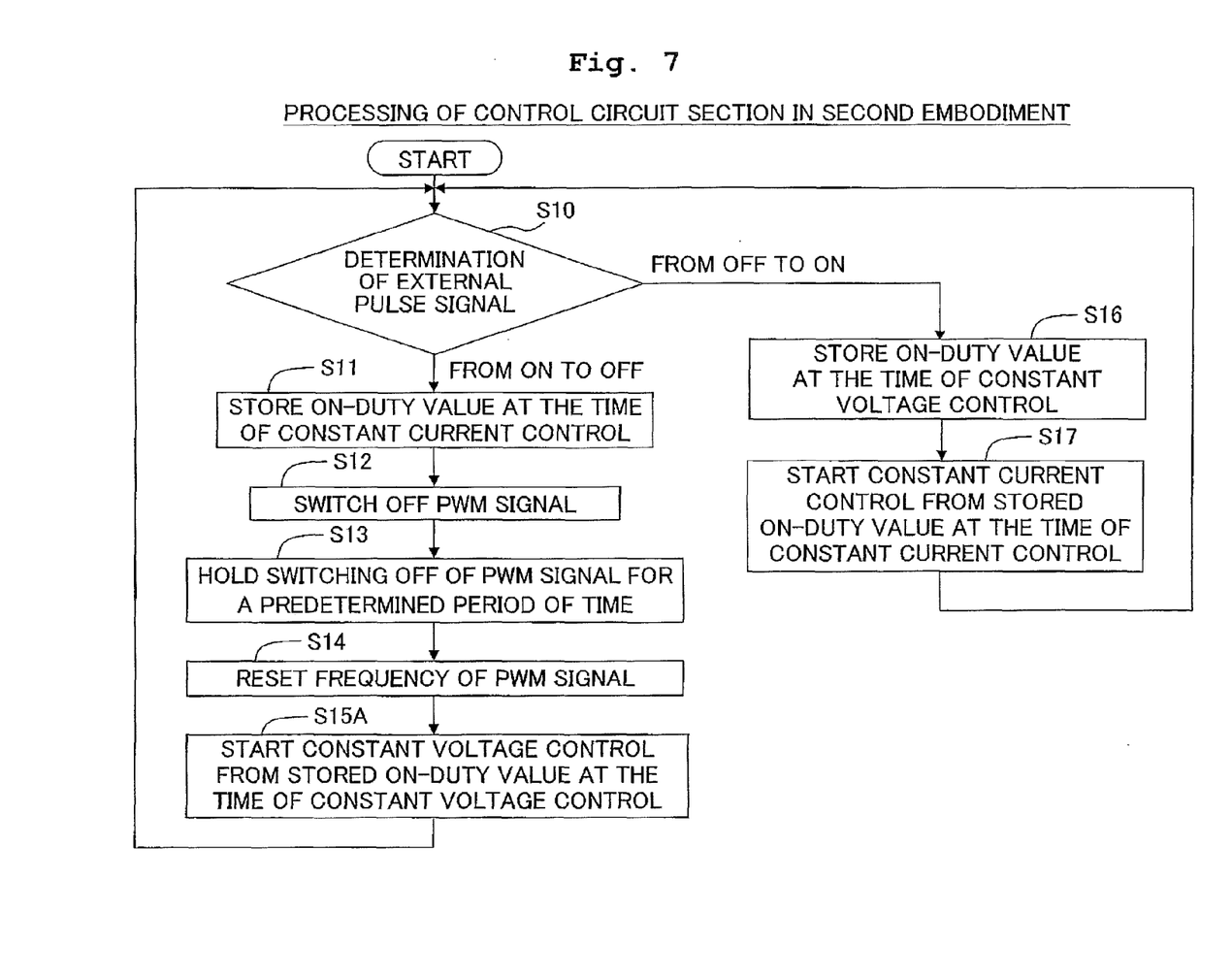
FIG. 7 is a flow chart showing a processing performed in a control circuit section in a second embodiment of the present teaching.

FIG. 7 is a flow chart showing a processing performed in a control circuit section in the second embodiment. In FIG. 7, elements or parts same or similar to those in the flow chart showing the control circuit section 4 in the first embodiment (FIG. 2) are assigned with same reference numerals.

After starting the processing, the control loop determining section 10 of the control circuit section 4 makes, in Step S10, determination for the external pulse signal Po based on the pulse controlling signal Sp inputted from the external pulse determining section 7. When the external pulse signal Po is transited from ON to OFF, the control circuit section 4 performs the processing of Step S11; when the external pulse signal is transited from OFF to ON, the control circuit section 4 performs the processing of Step S16.

Since the processings of Steps S11 to S14 are sane as those of the flow chart in the first embodiment shown in FIG. 2, any overlapping explanation will be omitted.

In Step S15A, the control loop determining section 10 instructs the output voltage controlling section 9 so that the pulse signal Pa is outputted with a ON-duty value at the time of the constant voltage control and stored in the duty storage section 11 so as to start the constant voltage control (feedback control) and to return the procedure to the processing of Step S10. After that, the control loop determining section 10 performs the processing in Step S10 for making determination for the external pulse signal Po based on the pulse controlling signal Sp; in parallel to this, the output voltage controlling section 9 performs the constant voltage control so that a predetermined bias voltage Vb (the voltage value within such a range that the load 30 is not switched ON) is applied to the load 30, by a pulse signal Pa of which ON-duty value is smaller than that of the first pulse signal Pa1.

In Step S16, the control loop determining section 10 stores, in the duty storage section 11, the ON-duty value at the time of the constant voltage control, and performs the processing of Step S17.

The processing of Step S17 is same as that of the flow chart in the first embodiment shown in FIG. 2.

Effect of Second Embodiment

The second embodiment described above has an effect (E) as follows, in addition to the effects (A) to (D) described above regarding the first embodiment.

(E) The load driving apparatus 1 can converge the constant voltage control in a short period of time, and can prevent any overshoot and/or undershoot which would have otherwise occurred at the time of starting the constant voltage control.

In the first embodiment, the control loop determining section 10 starts in Step S15 the constant voltage control (feedback control) by instructing the output voltage controlling section 9 to output the second pulse signal Pa2 at the pre-set, predetermined ON-duty value (fixed value), as described above. On the other hand, in the second embodiment, the ON-duty value at the time of the constant voltage control is stored in the duty storage section 11 (Step S16), and the pulse signal Pa is outputted with the ON-duty value at the time of the constant voltage control which is stored in the duty storage section 11 (Step S15A). In the second embodiment, the second pulse signal Pa2 is outputted with the ON-duty value during the most recent constant voltage control performed immediately before, as described above. Therefore, in the second embodiment, it is possible to converge the constant voltage control in a shorter period of time as compared with the case of the first embodiment, and to prevent the overshoot and/or undershoot at the start of the constant voltage control.

Modifications

The present teaching is not limited to the embodiments described above, and may be modified without departing from the scope and true spirit of the present teaching, such as modifications (a) to (g) as follows.

(a) It is not necessarily indispensable that the ON-duty value of the first pulse signal Pa1 stored in the duty storage section 11 is the average value of the ON-duty values of all the first pulse signals Pa1 during the most recent ON-operation period of the load 30 performed immediately before. The ON-duty value of the first pulse signal Pa1 stored in the duty storage section 11 may be, for example, an average value of a plurality of first pulse signals Pa1 during any predetermined period in the ON-operation period, or may be the ON-duty value of the first pulse signal Pa1 in the last frequency during the ON-operation period, etc. In this case, as the number of the plurality of pulses of which average value is to be employed is greater, the rising operation can be made more stable.

(b) Regarding the second pulse signal Pa2 in the first embodiment, the PWM frequency of the second pulse signal Pa2 is reset when the constant voltage control is started, and the pulse output of the second pulse signal Pa2 is started. However, there is no limitation to this; the PWM frequency of the second pulse signal Pa2 may be reset always at a same timing with respect to the timing at which the constant voltage control is started, and the pulse output of the second pulse signal Pa2 may be started. Namely, the second pulse signal Pa2 may be ON at the same time with the start of the constant voltage control; further, the second pulse signal Pa2 may be ON after a predetermined delay time since the start of the constant voltage control.

(c) The load 30 is not limited only to the light emitting element such as IED, laser diode, etc., and may be an element in which a predetermined voltage drop is occurred when being applied with the voltage in the direction of electric conduction of the element such as, for example, a Diode, a photo coupler, an Organic Electro-Luminescence element, an Inorganic Electro-Luminescent element, a transistor, a Field Effect Transistor (FET), an Insulated Gate Bipolar Transistor (IGBT), etc.

(d) It is not necessarily indispensable that the pulse signal Pa outputted by the control loop determining section 10 is a PWM signal; the pulse signal Pa may be a Pulse Density Modulation signal (PDM signal), Pulse Position Modulation Signal (PPM signal), Pulse Frequency Modulation signal (PFM signal), etc.

(e) When the external pulse signal Po is switched from OFF to ON, the control loop determining section 10 may output a signal with H-level for a predetermined period of time previously set to the switching element driving circuit 3, then the control loop determining section 10 may reset the frequency of the pulse signal Pa, and may output the first pulse signal Pa1 having the ON-duty value stored in the duty storage section 11. With this, the control loop determining section 10 can raise the output current Io at a high speed to drive the load 30. Further, the control loop determining section 10 can raise the output current Io always after the same, stable delay time with respect to the timing at which the external pulse signal Po is transited from OFF to ON, regardless of the ON/OFF frequency of the external pulse signal Po.

(f) The control loop determining section 10 may reset the frequency of the pulse signal Pa when the external pulse signal Po is switched from OFF to ON, and the control loop determining section 10 may output the first pulse signal Pa1 having the ON-duty value at the time of the constant current control stored in the duty storage section 11. With this, the control loop determining section 10 can raise the output current Io at a timing same as the timing at which the external pulse signal Po is transited from OFF to ON, regardless of the ON/OFF frequency of the external pulse signal Po.

(g) The output current controlling section 8 and the output voltage controlling section 9 of the first embodiment perform the PID control. However, there is no limitation to this; the output current controlling section 8 and the output voltage controlling section 9 may perform other classic control represented, for example, by the PI control, PD control, etc., and other control based on the so-called modern control theory.

(h) In the first and second embodiments described above, the PWM signal is switched OFF for a predetermined period of time after performing the constant current control. The present teaching, however, is not limited only to such a configuration, and it is possible to provide a period during which the PWM signal is not switched OFF. Alternatively, it is possible to perform a control for rapidly lowering the strength of the output signal by using a pulse signal having a ON-duty value which is set so as to make the output voltage outputted to the load be substantially 0 for the predetermined period of time, instead of switching the PWM signal OFF for the predetermined period of time.

What is claimed is:

1. A load driving apparatus configured to drive a load by electric power supplied from a power source, comprising:
    a power converter circuit configured to convert the electric power supplied from the power source into direct current power and to supply the converted direct current power to the load;
    an output electric current detecting circuit configured to detect an output current flowing in the load; and
    a control circuit section configured:
        to switch an ON-operation and an OFF-operation of the load depending on an operation instruction information inputted from outside of the load driving apparatus,
        to perform constant current control during a period of the ON-operation of the load based on the output electric current,
        to output a first pulse signal to the power converter circuit when starting the constant current control, ON-duty of the first pulse signal being substantially same as that during a period of a most recent operation of the load performed immediately before, and
        to perform constant voltage control during a period of the OFF-operation of the load based on an output voltage applied to the load, and to output a second pulse signal, for applying a predetermined bias voltage to the load, to the power converter circuit.

2. The load driving apparatus according to claim 1, wherein the ON-duty of the first pulse signal outputted by the control circuit section when starting the constant current control is an average value of ON-duty of the first pulse signal in a steady state during the period of the most recent operation of the load performed immediately before.

3. The load driving apparatus according to claim 1, wherein ON-duty of the second pulse signal outputted by the control circuit section when starting the constant voltage control is an average value of ON-duty of the second pulse signal in a steady state during a period of a most recent constant voltage control performed immediately before.

4. The load driving apparatus according to claim 1, wherein the control circuit section provides an OFF-period during which output of the first pulse signal and output of the second pulse signal are stopped for a predetermined period of time spanning from start of the OFF-operation of the load during which the load is switched OFF and until start of the constant voltage control.

5. The load driving apparatus according to claim 4, wherein the control circuit section starts the output of the second pulse signal at a same timing when staring the constant voltage control after end of the OFF-operation of the load.

6. The load driving apparatus according to claim 3, wherein the control circuit section includes a storage section configured to store an ON-duty value of the first pulse signal during the period of the operation of the load.

7. The load driving apparatus according to claim 1, wherein the control circuit section includes:
   an output electric current controlling section configured to output an output current controlling signal based on the output current detected in the output electric current detecting circuit and a reference current;
   an output voltage controlling section configured to output an output voltage controlling signal based on the output voltage applied to the load and a reference voltage;
   an operation information determining section configured to perform determination of the ON-operation/OFF-operation of the load based on the operation instruction information, and to output a pulse controlling signal; and
   a control loop determining section configured to perform determination of a control loop of the load based on the output current controlling signal, the output voltage controlling signal and the pulse controlling signal so as to control a pulse signal to be outputted to the power converter circuit.

8. The load driving apparatus according to claim 4, wherein a period of the OFF-operation is set to be same as a period of time until the output voltage outputted to the load during the period of the operation of the load is decreased to be substantially same as the bias voltage.

9. The load driving apparatus according to claim 1, wherein the control circuit section outputs a pulse signal for a predetermined period of time spanning from start of a period of the OFF-operation of the load and until start of the constant voltage control, the pulse signal having a value of ON-duty which is set so as to make the output voltage outputted to the load be substantially zero.

10. A controlling method for controlling a load driving apparatus configured to drive a load when receiving a supply of electric power, the method comprising:
    performing constant current control during a period of an operation of the load based on an output current, and outputting a first pulse signal when starting the constant current control, ON-duty of the first pulse signal being substantially same as that during a period of a most recent operation of the load performed immediately before; and
    performing constant voltage control based on an output voltage during a period of an OFF-operation of the load, and outputting a second pulse signal for applying a bias voltage having a predetermined value to the load.

11. The controlling method for controlling the load driving apparatus according to claim 10, wherein the ON-duty of the first pulse signal outputted when starting the constant current control is an average value of ON-duty of the first pulse signal in a steady state during the period of the most recent operation of the load performed immediately before.

12. The controlling method for controlling the load driving apparatus according to claim 10, wherein ON-duty of the second pulse signal outputted when starting the constant voltage control is an average value of ON-duty of the second pulse signal in a steady state during a period of a most recent constant voltage control performed immediately before.

13. The controlling method for controlling the load driving apparatus according to claim 10, further comprising stopping output of the first pulse signal and stopping output of the second pulse signal for a predetermined period of time spanning from start of the period of the OFF-operation of the load and until start of the constant voltage control.

* * * * *